July 18, 1967  L. ELSNER  3,331,173
COMPOUND CONSTRUCTION ELEMENTS AND METHOD OF
MANUFACTURE AND ASSEMBLY
Filed July 19, 1963  2 Sheets-Sheet 1

# United States Patent Office 3,331,173
Patented July 18, 1967

3,331,173
COMPOUND CONSTRUCTION ELEMENTS AND METHOD OF MANUFACTURE AND ASSEMBLY
Lothar Elsner, Georg-Beutler Strasse 18, Heidenheim (Brenz), Germany
Filed July 19, 1963, Ser. No. 296,315
14 Claims. (Cl. 52—309)

This invention relates to novel construction elements and to the method of manufacturing and assembling these elements.

In the past, the building materials used for lightweight vehicles, such as trailers, boats, superstructures, furniture and similar objects, have frequently included besides metal also wood with a plywood surface. It has been proposed already to employ pressboard plates, or plastic and similar materials for this purpose. However, vehicles made of such materials must be provided with special braces in order to maintain their stability, for example frames of metal or wood, so that the overall structure has a relatively heavy weight. However, this is unfavorable for instance in the case of trailers for passenger cars, because there are official regulations which fix maximum weights for practical reasons.

The present invention relates to the manufacture of light-weight construction elements for a type of construction which uses only plastic materials and provides a stable structure of the above mentioned units without requiring special supporting and bracing frames for that purpose. Thus it is possible to build a trailer with a self-supporting structure which, as compared to the method of construction commonly used hitherto, has only approximately half the former weight, and moreover has a number of additional advantages. At the same time, there is no need for any screw coupling of the individual walls or parts of the unit which is made entirely of this novel construction element. Furthermore the advantages which are provided when using plastic materials, for example low specific weight, accompany this invention. The plastic material employed has a high insulating capacity against sound and temperature, and as a supporting material it can also absorb pressure or stress forces. In addition it may be worked very easily.

All of the above mentioned advantages are achieved in accordance with this invention by using a reinforced sandwich type construction. This refers to a flat multi-layer construction element which is formed by a homogeneous connection of two outer plates or shells enclosing a central supporting layer.

In accordance with one object of this invention, the relatively thin outer walls or shells, which are capable of absorbing forces over their entire surface, consist of a polyester resin reinforced with a glass fiber web and mat. By means of polyester resin or other resins, the central supporting layer is intimately connected to these outer walls, the central layer being made of a suitable known type of hard resin foam, for example one of those marketed under the commercial names Styropor, Moltopren, Airex and others. As a connecting medium in conjunction with epoxy resin, Styropor has been found to be a very economical material.

In order to be able to absorb especially large forces at specific points or places of these novel construction elements, such as is frequently the case with trailers, supporting elements for prefabricated houses and the like, a novel approach is utilized here in that the central layer, which consists mostly of prefabricated foam resin pieces, is assembled preferably at those points which have to absorb particularly high forces. If required, the widths and lengths of the central layer are selected to meet the requirements for reinforcement independently of the sizes delivered by the supplier. Into the joints of the assembled pieces resin-impregnated strips of glass fiber fabric are placed, the edges of which are bent over where they join the outer walls to produce a series of rib-like, load-bearing profiles and when pressed together, also effect a consolidation of the supporting walls. In this manner, sudden changes in cross-section, which from a static point of view would constitute points of stress concentration or weakness are also avoided.

Longitudinal stresses, such as occur in a vertically stressed wall element, are absorbed by the supporting profiles formed in this manner as well as by the foam material and the cover layers, whereby additional supporting framework is unnecessary. Especially in cases of bending stresses, the profile supports also absorb a certain portion of the shearing stresses of the neutral layer, i.e. of the central supporting layer.

The invention may be better understood and its numerous advantages will become apparent by reference to the accompanying drawing in which.

Figure 1:
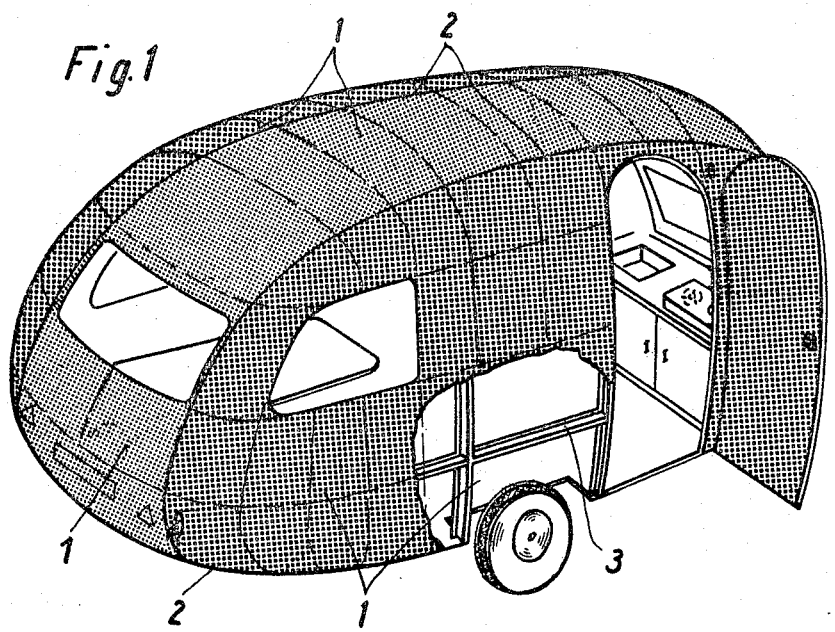
FIG. 1 is a perspective view of a trailer built from the novel construction element according to the invention.
Figure 3:
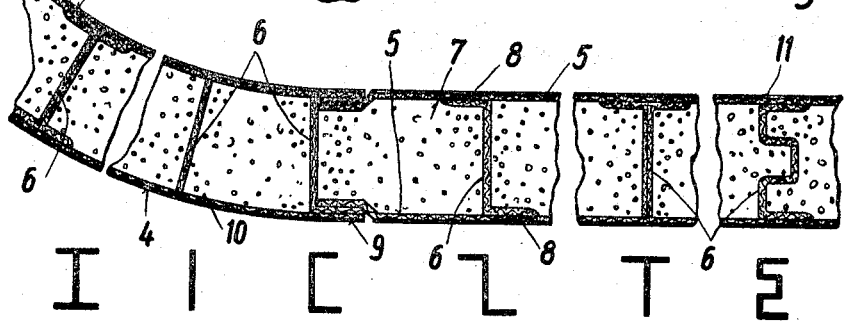
FIG. 3 shows a cross-section through the structure of a construction element and a number of possible profile cross-sections in approximately the dimensions used for trailers.
Figure 5:
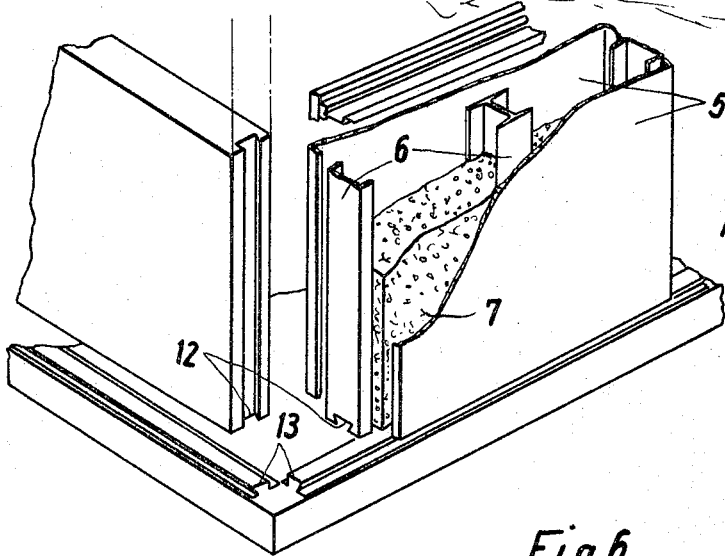
FIG. 5 shows an exploded view of a single plate partly broken away, for a house as shown in FIG. 4.
Figure 6:
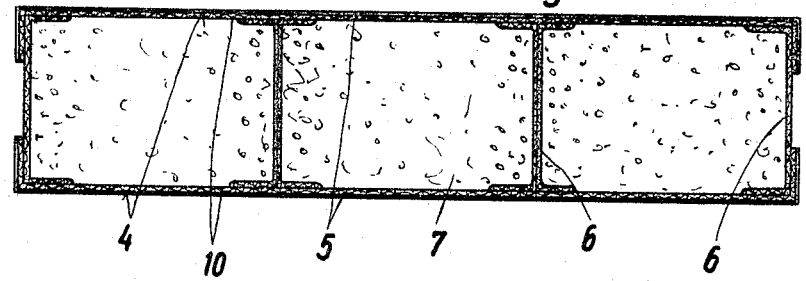
FIG. 6 is a representation similar to that of FIG. 3 showing a sectional view of the wall of a house according to FIG. 4.

Referring now to FIGURE 1, the individual construction elements 1 constituting the trailer have a joint 2 therebetween. The size of the elements or blocks is determined by the possibility for best assembling the desired trailer, prefabricated house, piece of furniture or the like. The plates or shells forming the outer and inner sides of the trailer are indicated at 4 and 5 in FIGURES 3 and 6. They enclose the central layer 7 and are connected with the latter by a connecting or bonding means 10, represented by a thin line in FIGURES 3 and 6. The shells themselves consist of a polyester resin reinforced with a glass fiber web or mat, if desired only with a mat reinforcement. The central layer 7 serves as supporting material and consists of a strong plastic foam. As this plastic material is commercially available only in predetermined sizes or is arbitrarily cut, the individual pieces are connected with one another by interposing a joint tape 6 or 12 respectively, which is impregnated with a polyester or epoxy resin. The tape is applied so as to have a cross-sectional area in the form of a double S, an I, C, T, or of a similar shape, such as it is shown in FIGURES 3, 5 and 6. By utilizing the interposed resin impregnated tape to join the pieces of plastic foam material together, the requirement of a smooth boundary between abutting pieces of foam material is avoided. As indicated at 11 in FIGURE 3, the resin impregnated tape readily conforms to the irregular boundary. This provides a very stable, sturdy structure at this joint.

When two complete construction parts or blocks are to be joined, it is necessary also that the outer walls be connected to each other. That is achieved by cutting down or overlapping the two outer layers at their connecting points 8 and 9 (FIGURE 3). Also in case of an overlap as shown at 9 it is possible to insert a joint tape whose cross-section has a C profile in this instance.

Figure 2:
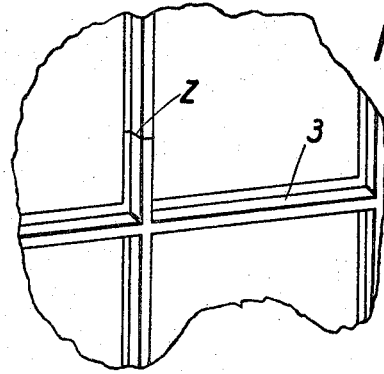
FIG. 2 shows an enlarged view of the cut away sector indicated in FIG. 1.

The cutaway portion of FIGURE 1 shown in FIGURE 2 on an enlarged scale illustrates profile frames of a side wall assembled by this method where the outer wall and also the inner supporting substance 7 is removed. Thus, the only remaining parts are the Z-shaped reinforcing profiles indicated by Z in FIGURE 2. From this illustration it may be seen that this framework which consists of the solidified, impregnated tape 6, gives the block fabricated from the novel construction element a stability which it has been impossible to attain so far. At the same time, the weight of the unit is very low due to the plastic foam filling, and the manufacturing process is extremely simple and economical.

Figure 4:
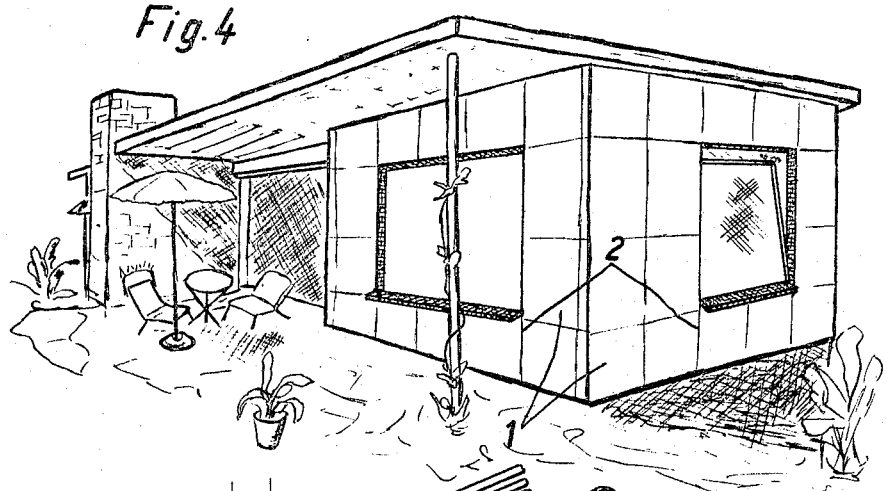
FIG. 4 illustrates a small prefabricated house built of the construction elements according to this invention.

The illustration of FIGURE 5 shows the structure of a single construction block for the small house depicted in FIGURE 4. There has been selected, besides the C or double-S cross-sectional area, also a dove-tail shape of the joint tape, which may be seen at 12. At 13 are also indicated dove-tail shaped profiles which serve to attach the side walls to the base plate.

For manufacturing the various construction elements, the two outer shells or plates are fabricated first. For that purpose, use is made of molding dies which exactly correspond to the configuration of the shells. An insulating separating agent, for example a wax, is first deposited on the molding dies. Thereafter, a layer of varnish or gel dyed in any desired color, is sprayed on. When that layer, which has a thickness of .3 to .4 millimeter, has hardened, glass fiber webbing and mats are applied and a liquid polyester resin is sprayed therebetween. A rubber or plastic foil pressure pad is inserted and the molding dies are separated, so that the pressurized pressure pad will press the outer layers or shells against the dies until polymerization has taken place. The uniform pressure of the pad produces a very uniform wall thickness and air bubbles are avoided.

After the molded shells have hardened the dies are pulled apart and these pressed construction elements will first remain on the dies. The supporting layer of foam is then applied, preferably into the concave side of the outer layer. The foam parts are joined in such a manner that their joints come to lie on desired areas of the outer plates or shells. Prior to this the surfaces are sprayed with a resin, such as, an epoxy resin. Before the molds are placed again in contact with the shells and before the foam parts are applied thereon, strips of glass fiber webbing and/or matting are inserted into the joints, and of a larger width than the thickness of the foam material. When joined with the outer shells, the slightly protruding edges of the joint tapes are first folded over, and if necessary, held in position with a number of staples, in a manner to produce different desired profile cross-sections, for example that of a double-S, an I, a C, a Z, a T, and the like. Thus, when the shells lying in the molding dies are again fitted together, the pressure pad has been replaced by the foam layer. The pressure pad itself is placed between two sets of dies, the sets for the left and right side walls of the trailer, in which process the entire die unit is clamped together. The pressurized pad, which may be clamped in a ring-shaped frame corresponding to the side elevation of one side wall, now presses the three respective layers (polyester-foam-polyester) of the left and right side walls uniformly together. In an analogous manner, this method may also be used in connection with flat construction elements such as plates for prefabricated houses.

In case of a trailer, it is advisable to produce seven parts, namely the two side walls, a bottom part, a roof part, a front part and a rear part as well as a door. For each of these parts a corresponding double molding die is needed for producing the two outer shells or plates.

When employing the above described compound type of construction, it is preferable that the external forces act on the joints and the framework that has been produced, because the highest stability is obtained at these points.

When assembling the individual construction elements, it is possible to press or cut grooves or channels for electric conductors or cables, and if required also for pipes, so that once the construction elements have been finished it will not be necessary to lay cables over the plates. The thickness of the construction elements, which is chosen in accordance with the required bearing strength, for example 30 millimeters for trailers or approximately 85 millimeters for prefabricated house elements, provide an excellent heat and sound insulation in particular due to the foam-like central layer. The specific weight is very low, so that in case of a trailer such a type of construction results in the center of gravity being shifted largely toward the bottom, which has an extremely favorable influence on the roadability. Moreover, the novel construction element is very easy to process, i.e. to grind, screw, saw, etc., the outer layers reaching the tensile and compressive strengths of alloyed light metals.

For the purpose of compressing the molding dies for the manufacture of the construction elements, it is also possible to employ other known pressing processes and equipment.

What is claimed is:

1. The method of producing a compound building element comprising:
    (a) disposing a pair of outer layer panel members of resin impregnated glass fiber sheet material in generally opposite relationship,
    (b) abutting at least one pair of complementary shaped solid foamed spacer material between said panel members,
    (c) disposing a tape means of glass fiber impregnated with adhesive material between the boundary formed by said at least one pair of complementary shaped foamed material,
    (d) bending at least one end of said tape parallel to at least one of said panel members,
    (e) bonding said panel members of resin impregnated glass fiber sheet material to said tape means and to said foamed material.

2. The method as set forth in claim 1 wherein said adhesive material is a synthetic polyester resin.

3. The method as set forth in claim 1 in that prior to the bonding step further including disposing said tape means by
    (a) bending said tape means at an edge to form a first flange,
    (b) positioning said flange in abutting relationship with one of said panel members,
    (c) bending the other edge of said tape means to form a second flange in a non-opposed relationship to said first flange,
    (d) positioning said second flange in abutting relationship with the other of said panel members.

4. The method as set forth in claim 1 in that prior to the bonding step further including disposing said tape means by
    (a) placing two mutually-opposed tape means in a mating relationship,
    (b) bending an edge of one of said two mutually opposed tape means to form a first flange,
    (c) bending an edge of said other joint tape means to form a second flange,
    (d) positioning said first and second flanges in abutting relationship with one of said panel members.

5. The method as set forth in claim 1 in that prior to the bonding further including disposing said tape means by
    (a) placing two mutually opposed tape means in a mating relationship,
    (b) bending both edges of one said tape means to form a first pair of mutually opposed flanges,
    (c) bending both edges of said other tape means to form a second pair of mutually opposed flanges, (d) positioning said first and second pair of flanges in abutting relationship with said panel members.

6. The method of claim 1 in that prior to the bonding step further including disposing said tape means by
   (a) bending said tape means at each edge to form a pair of mutually opposed flanges,
   (b) positioning said flanges in an abutting relationship with said panel members.

7. The method of producing a wall structure including a plurality of building elements comprising:
   (A) producing each of said building elements by
      (a) disposing panel members of glass fiber sheet material in generally opposite relationship,
      (b) abutting at least one pair of complementary shaped solid foamed material between said panel members,
      (c) disposing a tape means of glass fiber impregnated with adhesive material between the boundary formed by said at least one pair of complementary shaped foamed material,
      (d) bonding said panel members to said tape means and to said foamed material,
   (B) connecting at least a first and a second building element together by
      (e) positioning an outwardly exposed face of said foamed material of said first building element in close relationship with an outwardly exposed face of said foamed material of said second building element,
      (f) forming a recess means in one of said faces,
      (g) forming projection means in the other of said faces,
      (h) disposing a tape means of glass fiber impregnated with adhesive material between the boundary formed by said recess means and said projection means,
      (i) bending the edges of said tape means to form a pair of mutually opposed flanges,
      (j) positioning said flanges in abutting relationship with said panel members,
      (k) bonding said building elements together.

8. Method of molding a light weight compound building block in a two-part mold comprising:
   (a) applying a coating of heat separable material to the inner surfaces of the mold,
   (b) applying a lacquer coating on said heat separable coating,
   (c) applying at least one glass fiber reinforced polyester sheet on said lacquer coating,
   (d) placing at least two pieces of synthetic foam material in close relationship to said glass reinforced polyester sheet,
   (e) disposing a tape means of glass fiber impregnated with adhesive material between the boundary formed by said pieces of foamed material,
   (f) applying a bonding resin between said foamed material and said sheet,
   (g) pressing said sheet against said foamed material to effect a bonding therewith,
   (h) and removing said compound building block from the mold.

9. A lightweight construction element of high strength to weight ratio, said element comprising:
   (a) a pair of outer layers,
   (b) a plurality of pieces of foamed material positioned between said outer layers,
   (c) said outer layers being of a glass fiber fabric impregnated with synthetic plastic adhesive material,
   (d) said pieces of foamed material being positioned closely to adjacent foam pieces,
   (e) at least one joint tape positioned between said adjacent pieces and being substantially transverse to and having a significant portion parallel to said outer layers,
   (f) said joint tape being of a glass fiber fabric impregnated with synthetic plastic adhesive material and secured to said outer layers and to said adjacent pieces with said adhesive material.

10. The combination as set forth in claim 9 wherein said joint tape has a cross-section substantially C shaped.

11. The combination as set forth in claim 9 wherein said joint tape has a cross-section substantially Z shaped.

12. The combination as set forth in claim 9 wherein said joint tape has a cross-section substantially double S shaped.

13. The combination as set forth in claim 9 wherein said joint tape has a cross-section substantially I shaped.

14. The combination as set forth in claim 20 wherein said joint tape has a cross-section substantially T shaped.

References Cited
UNITED STATES PATENTS

| | | | |
|---|---|---|---|
| 2,348,658 | 5/1944 | Slaughter | 52—309 X |
| 2,850,890 | 9/1958 | Rubenstein | 52—309 X |
| 2,896,271 | 7/1959 | Kloote et al. | 20—4 |
| 3,043,730 | 7/1962 | Adie | 161—123 X |
| 3,197,352 | 7/1965 | Coates | 156—242 |
| 3,248,273 | 4/1966 | Boicey | 52—309 X |

EARL M. BERGERT, Primary Examiner.

HAROLD ANSHER, Examiner.